US012811458B2

(12) United States Patent
Toya et al.

(10) Patent No.: US 12,811,458 B2
(45) Date of Patent: Nov. 24, 2026

(54) ROTARY ELECTRIC MACHINE HAVING A STATOR COIL ARRANGEMENT

(71) Applicant: Hitachi Astemo, Ltd., Hitachinaka (JP)

(72) Inventors: Akihito Toya, Hitachinaka (JP); Akira Toba, Hitachinaka (JP); Keisuke Tateno, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 200 days.

(21) Appl. No.: 18/728,801

(22) PCT Filed: Jan. 20, 2022

(86) PCT No.: PCT/JP2022/001996
§ 371 (c)(1),
(2) Date: Jul. 12, 2024

(87) PCT Pub. No.: WO2023/139724
PCT Pub. Date: Jul. 27, 2023

(65) Prior Publication Data

US 2025/0112514 A1 Apr. 3, 2025

(51) Int. Cl.
*H02K 3/28* (2006.01)

(52) U.S. Cl.
CPC .................................... *H02K 3/28* (2013.01)

(58) Field of Classification Search
CPC .. H02K 3/00; H02K 3/28; H02K 3/46; H02K 3/48; H02K 3/50
USPC .......................................................... 310/208
See application file for complete search history.

(56) References Cited

U.S. PATENT DOCUMENTS

2014/0300236 A1* 10/2014 Takizawa ........... H02K 15/0414 310/198
2015/0076953 A1 3/2015 Tamura
2018/0254681 A1* 9/2018 Hashimoto ............ H02K 1/165
2018/0287445 A1* 10/2018 Ishizuka .................. H02K 1/16
2018/0331605 A1* 11/2018 Motoishi ............ H02K 15/0414
(Continued)

FOREIGN PATENT DOCUMENTS

JP 2013-226028 A 10/2013
JP 2021-22998 A 2/2021
(Continued)

OTHER PUBLICATIONS

Extended European Search Report issued in European Application No. 22921882.1 dated Sep. 2, 2025 (10 pages).
(Continued)

*Primary Examiner* — Rashad H Johnson
(74) *Attorney, Agent, or Firm* — Crowell & Moring LLP

(57) ABSTRACT

A rotary electric machine includes a stator core and a stator coil. The stator coil includes two linear portions and a turn portion that connects the two linear portions. The turn portion includes a top portion, an inclined portion that connects the top portion and the linear portion, and a bent portion that is bent outward in a radial direction. First and second stator coils have bent portions that are at different positions in a circumferential direction. The bent portion of the first stator coil is formed at the inclined portion of the first stator coil. The bent portion of the second stator coil is formed at the top portion of the second stator coil. The turn portion of the second stator coil is closer to the stator core than the turn portion of the first stator coil.

3 Claims, 4 Drawing Sheets

(56) References Cited

U.S. PATENT DOCUMENTS

| | | | | |
|---|---|---|---|---|
| 2018/0342918 | A1* | 11/2018 | Hino | H02K 1/165 |
| 2020/0274413 | A1* | 8/2020 | Egashira | H02K 3/50 |
| 2020/0328646 | A1* | 10/2020 | Miyawaki | H02K 15/064 |
| 2021/0328474 | A1* | 10/2021 | Endo | H02K 21/14 |
| 2022/0140681 | A1* | 5/2022 | Uga | H02K 3/28<br>310/198 |
| 2022/0255386 | A1* | 8/2022 | Hijikata | H02K 3/12 |
| 2022/0294283 | A1* | 9/2022 | Hijikata | H02K 3/28 |
| 2024/0039355 | A1* | 2/2024 | Takahashi | B21D 28/26 |
| 2024/0223035 | A1* | 7/2024 | Takahata | H02K 3/12 |
| 2025/0112514 | A1* | 4/2025 | Toya | H02K 3/12 |

FOREIGN PATENT DOCUMENTS

| | | | |
|---|---|---|---|
| WO | WO 2018/003461 | A1 | 1/2018 |
| WO | WO 2019/130747 | A1 | 7/2019 |
| WO | 2021/019843 | A1 | 2/2021 |

OTHER PUBLICATIONS

International Search Report (PCT/ISA/210) issued in PCT Application No. PCT/JP2022/001996 dated Apr. 5, 2022 with English translation (4 pages).

* cited by examiner

ROTARY ELECTRIC MACHINE HAVING A STATOR COIL ARRANGEMENT

TECHNICAL FIELD

The present invention relates to a rotary electric machine.

BACKGROUND ART

In a process of inserting a coil into a stator core in a production process of a rotary electric machine, the coil is inserted into the stator core by directly pressing the coil toward the stator core using an insertion jig. However, since this has a structure in which the coil with the large crotch and the coil with the small crotch are inserted at positions overlapping in an axial direction, it is not possible to directly press all the coils from a predetermined direction. Therefore, the coil that is not able to be completely inserted is adjusted by being pressed from an oblique direction or the like, but this adjustment may cause a defect when the coil is inserted.

As a background art of the invention of the present application, PTL 1 below discloses a configuration in which top portions 63A and 63B do not overlap and are displaced in the radial direction in turn portions 62A and 62B of the coil.

CITATION LIST

Patent Literature

PTL 1: JP 2021-22998 A

SUMMARY OF INVENTION

Technical Problem

In the configuration of the related art, even in the configuration in which the turn portion of the coil is displaced in the radial direction, when the area of an exposed portion where the coils do not overlap each other varies due to design matters, there arises a problem that it is not possible to reliably press the coil during insertion by the insertion jig. In view of such circumstances, an object of the present invention is to provide a coil of a rotary electric machine in which a height of a coil end is suppressed and a defect rate during assembly is improved.

Solution to Problem

According to the present invention, a rotary electric machine includes a stator core provided with a plurality of slots; and a plurality of stator coils arranged side by side in a radial direction of the stator core and arranged in the plurality of slots, in which the stator coil includes two linear portions that penetrate through the slots different from each other in layers different from each other in the axial direction of the stator core, and a turn portion that connects the two linear portions, the turn portion includes a top portion which is at a position farthest from the stator core in the axial direction, two inclined portions that connect the top portion and the linear portion, and a bent portion that is bent outward in the radial direction, the stator coil includes a first stator coil and a second stator coil that overlap each other in the axial direction, bent portions of the first stator coil and the second stator coil are at different positions in a circumferential direction, the bent portion of the first stator coil is formed at the inclined portion of the first stator coil, the bent portion of the second stator coil is formed at the top portion of the second stator coil, and a turn portion of the second stator coil is located closer to the stator core than a turn portion of the first stator coil in the axial direction.

Advantageous Effects of Invention

According to the present invention, it is possible to provide a coil of a rotary electric machine in which a height of a coil end is suppressed and a defect rate during assembly is improved.

ONE EMBODIMENT AND OVERALL CONFIGURATION OF PRESENT INVENTION

Figure 1A:
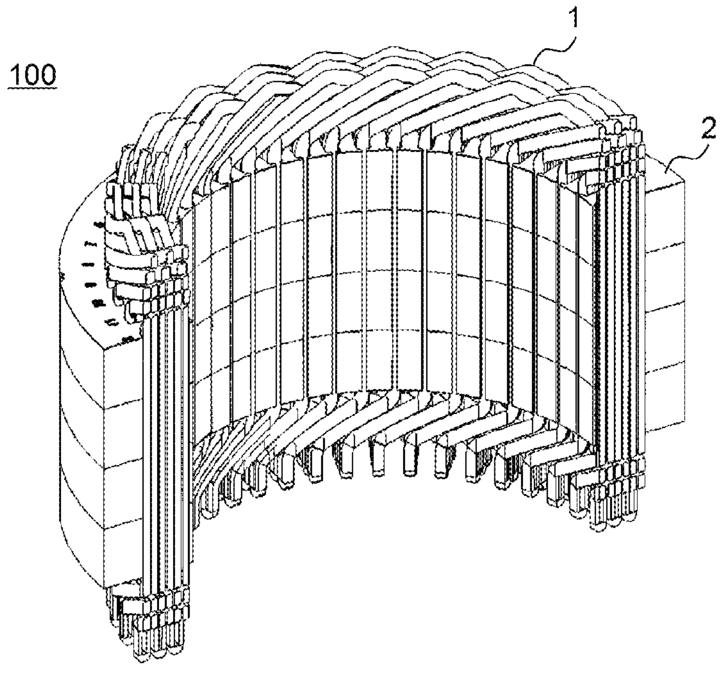
FIGS. 1A and 1B are cross-sectional views illustrating an entire structure of a stator included in a rotary electric machine.
Figure 1B:
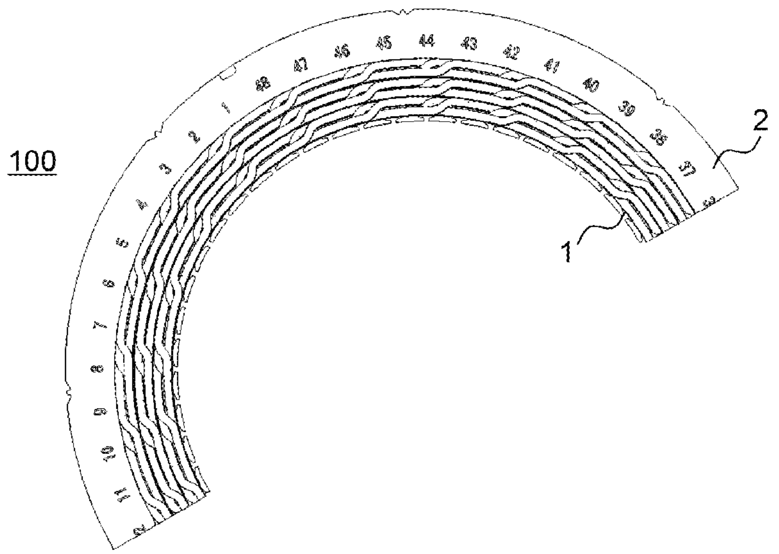

Hereinafter, an embodiment of the present invention will be described with reference to the drawings. The following description and drawings are examples for describing the present invention, and will be omitted and simplified as appropriate for the sake of clarity of description. The present invention can be carried out in various other forms. Unless otherwise specified, each component may be singular or plural.

Positions, sizes, shapes, ranges, and the like of components illustrated in the drawings may not represent actual positions, actual sizes, actual shapes, actual ranges, and the like in order to facilitate understanding of the invention. Therefore, the present invention is not necessarily limited to the positions, the sizes, the shapes, the ranges, and the like disclosed in the drawings.

FIG. 1

A stator 100 included in a rotary electric machine includes a stator coil 1 and a stator core 2 on the outer periphery of a rotor (not illustrated). A plurality of stator coils 1 arranged side by side in a radial direction are arranged in a plurality of slots (not illustrated) of the stator core 2.

FIG. 2

A stator coil 1A inserted into a stator in the related art will be described. When the stator coil 1A is inserted into a stator core 2, a large-crotch stator coil 1*c* and a small-crotch stator coil 1*d* are disposed to overlap each other. Each of the large-crotch stator coil 1*c* and the small-crotch stator coil 1*d* has a bent portion 8 that is bent in the radial direction at a top portion 6 which is a portion farthest from the stator core 2, in a turn portion which will be described later and is not inserted into the stator core 2. When viewed from the radial direction, bent portion axes 8*a* which are axes of the bent portions 8 overlaps each other.

Figure 2A:
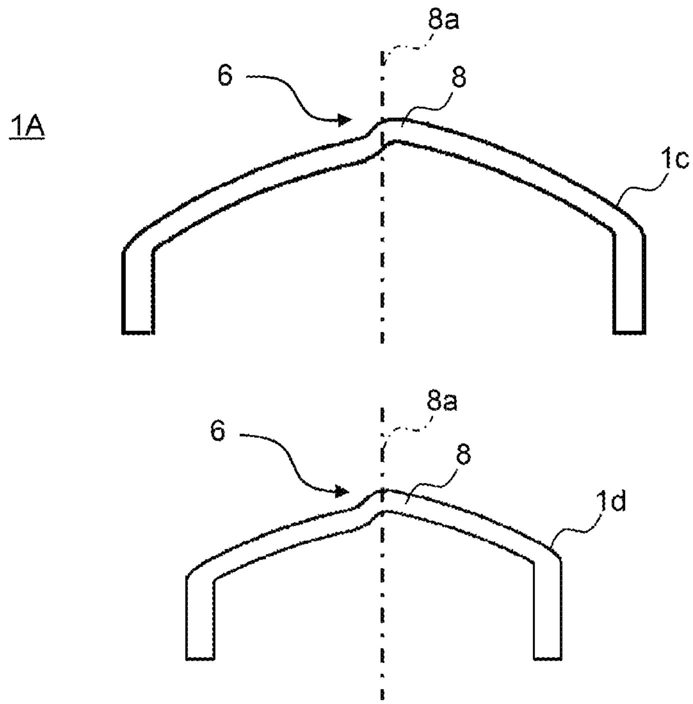
FIGS. 2A and 2B are views illustrating a positional relationship between an insertion coil and a stator core in the related art.
Figure 2B:
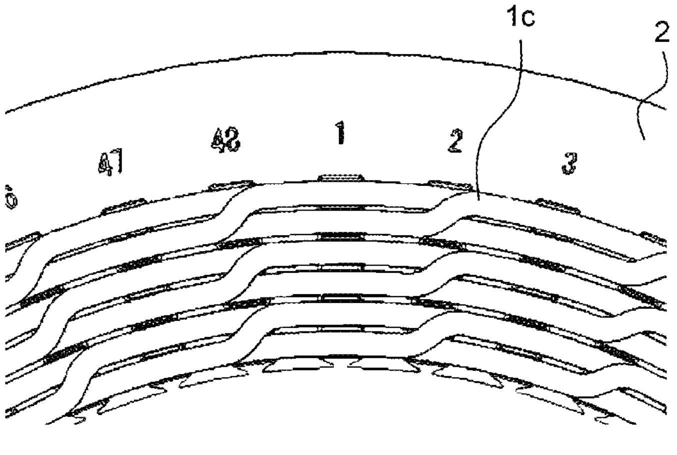

With such a configuration, the small-crotch stator coil 1*d* overlaps the large-crotch stator coil 1*c* when being inserted into the stator core 2. Thus, as illustrated in FIG. 2(*b*), the small-crotch stator coil 1*d* cannot be seen from a predetermined direction (direction from the top to the bottom in FIG. 2(*a*), direction from the front to the back in FIG. 2(*b*)). Thus, the small-crotch stator coil 1*d* is hardly pressed by the insertion jig that pushes and inserts the coil into the stator core 2. Therefore, there is a problem that the height of the coil varies after insertion, and a defect occurs in the production process.

For example, in order to solve this defect, there is a method in which all stator coils 1A are configured to be able to be reliably pressed by the top portion 6 is made higher to provide a margin for a space in a circumferential direction. When this configuration is applied to a large-crotch U-shaped stator coil 1*a* that is originally high in the axial direction, this leads to an increase in size of the entire rotary electric machine.

In addition, as a method for solving the problem without increasing the height of the top portion 6 as described above, the coil that cannot be pressed by the insertion jig in the related art is pressed not in an axial direction but in an oblique direction or the like for adjustment to suppress variations in the height of the coil. However, when such adjustment is performed, for example, a slot liner (not illustrated) wound around each stator coil 1A is dragged to a slot wall surface of the stator core 2, and thus the position of the slot liner may be displaced or broken, which causes a defect.

FIG. 3

A configuration of the stator coil 1 according to an embodiment of the present invention will be described. Note that, the vertical direction of the paper surface in FIG. 3(*a*) is the axial direction, and the vertical direction of the paper surface in FIG. 3(*b*) is the radial direction.

The stator coil 1 in the present invention has a linear portion 5 and a turn portion 4. The turn portion 4 connects two linear portions 5, and has a top portion 6 and an inclined portion 7. The linear portion 5 is a portion that is inserted into the stator core 2 and penetrates different layers of the slot. The top portion 6 is at a position farthest from the stator core in the axial direction. Two inclined portions 7 connect the top portion 6 and the linear portion 5.

The large-crotch stator coil 1*a* and the small-crotch stator coil 1*b*, which are the stator coils 1, are inserted into the stator core 2 in an overlapping manner. The inclined portion 7 of the large-crotch stator coil 1*a* is formed to be longer than the inclined portion 7 of the small-crotch stator coil 1*b*. The turn portion 4 of the small-crotch stator coil 1*b* is at a position closer to the stator core than the turn portion 4 of the large-crotch stator coil 1*a*.

Figure 3A:
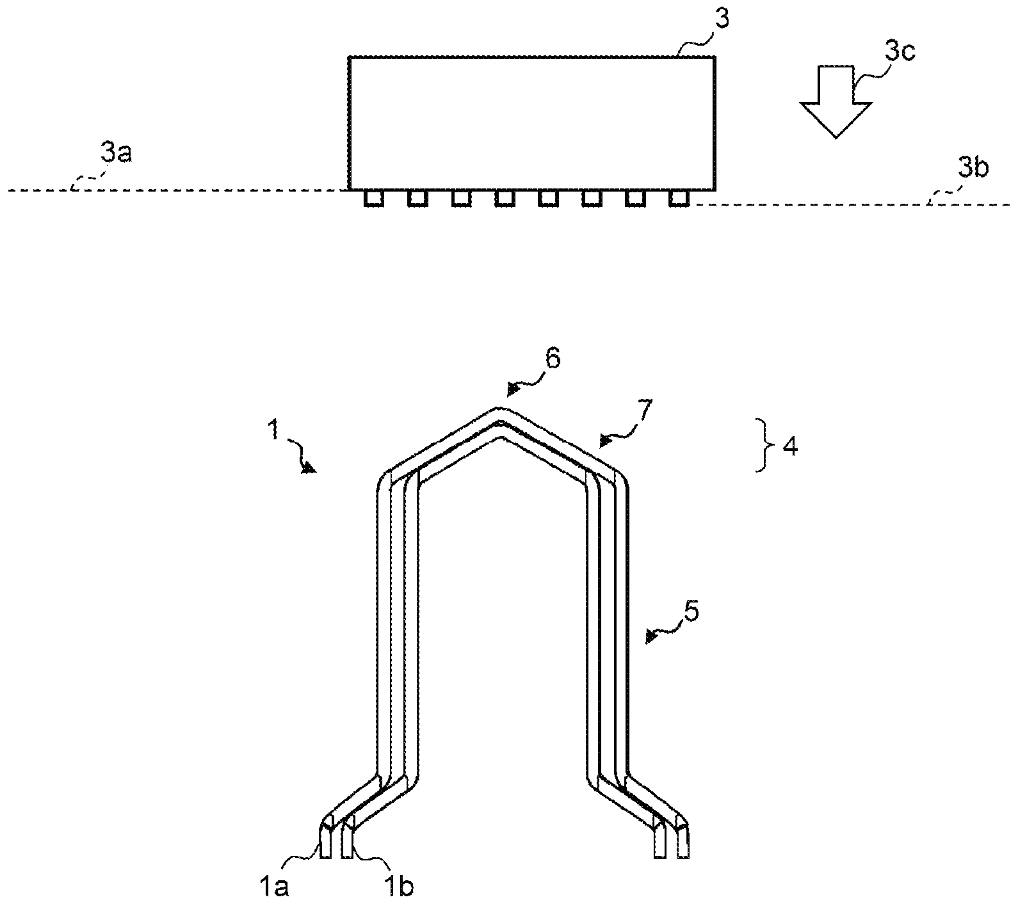
FIGS. 3A and 3B are explanatory views of an insertion coil and a pressing jig according to an embodiment of the present invention.
Figure 3B:
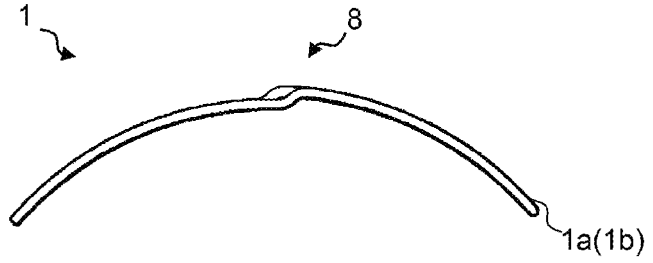

The large-crotch stator coil 1*a* and the small-crotch stator coil 1*b* are at different positions without overlapping each other, when the bent portions 8 provided in the respective stator coils 1*a* and 1*b* are viewed from a coil insertion direction (axial direction) (see FIG. 3(*b*)). That is, since the position of the bent portion 8 of the large-crotch stator coil 1*a* is shifted in the circumferential direction from the top portion 6, the top portion 6 and the bent portion 8 of the small-crotch stator coil 1*b* are exposed when viewed from the axial direction.

As a result, when the large-crotch stator coil 1*a* and the small-crotch stator coil 1*b* are pressed in a direction of an arrow 3*c* by an insertion jig 3, the large-crotch stator coil 1*a* and the small-crotch stator coil 1*b* can be reliably pressed by a large-crotch U-shaped coil pressing reference 3*a* and a small-crotch U-shaped coil pressing reference 3*b* of the insertion jig 3. Thus, it is possible to reliably insert the stator coils 1*a* and 1*b* into the stator core 2, and to reduce defects in the production process.

FIG. 4

Figure 4A:
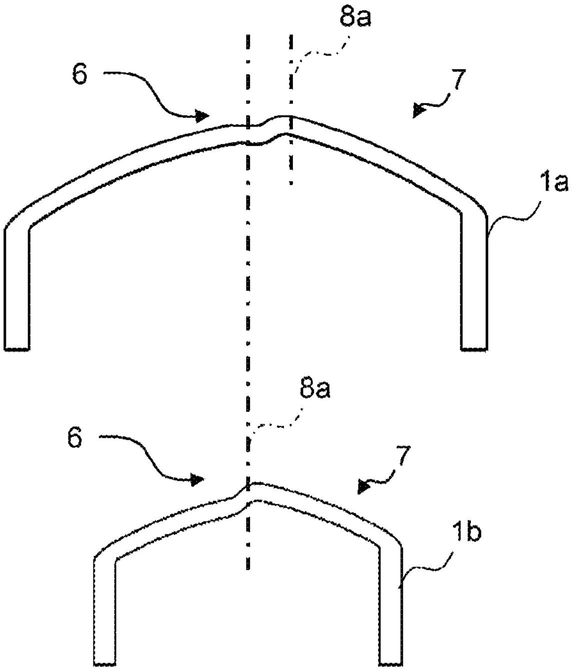
FIGS. 4A and 4B are views illustrating a positional relationship between the insertion coil and a stator core according to the embodiment of the present invention.
Figure 4B:
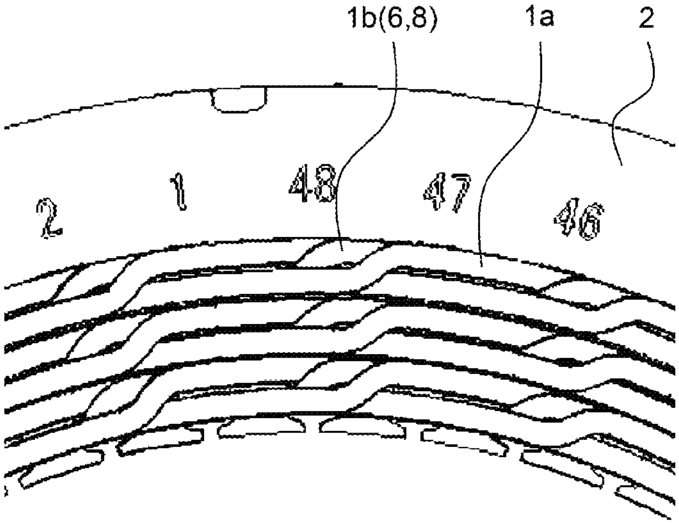

FIG. 4(*a*) is a separate view such that the position of the bent portion 8 illustrated in FIG. 3(*b*) is different between the large-crotch stator coil 1*a* and the small-crotch stator coil 1*b*. As illustrated in FIG. 4(*a*), axes 8*a* of the bent portion of the large-crotch stator coil 1*a* and the small-crotch stator coil 1*b* are shifted from each other in the axial direction. Further, the bent portion 8 of the large-crotch stator coil 1*a* is formed at the position of the inclined portion 7 on the outer diameter side instead of the top portion 6.

As illustrated in FIG. 4(*b*), when the large-crotch stator coil 1*a* and the small-crotch stator coil 1*b* are inserted into the stator core 2, the top portion 6 and the bent portion 8 of the small-crotch stator coil 1*b*, which are exposed due to the shift of the bent portion 8 of the large-crotch stator coil 1*a* in the circumferential direction, have an exposed area as large as the insertion jig 3 can directly and reliably press the top portion 6 and the bent portion 8.

Note that the reason why the bent portion 8 is formed on the inclined portion 7 side on the outer diameter side of the inclined portion 7 in the large-crotch stator coil 1*a* is that the exposed area with which the insertion jig can reliably press the small-crotch stator coil 1*b* is larger than that in a case where the bent portion 8 is formed at the inclined portion 7 on the inner diameter side. Since the exposed area is large, even if there is an error in design variation for each stator coil 1, the tolerance is absorbed, and the insertion jig can reliably press the small-crotch stator coil 1*b*. However, the bent portion 8 may be provided at the inclined portion 7 on the inner diameter side in the large-crotch stator coil 1*a* if the size of the exposed area with which the insertion jig can reliably perform pressing is formed.

With such a configuration, since the respective stator coils 1*a* and 1*b* are directly and uniformly pressed by the insertion jig, there is no variation in height after insertion, and it is possible to reduce defects such as slot liner breakage and to reduce production defects. In addition, since the position of the top portion 6 in the axial direction is not different from those of the stator coils 1*c* and 1*d* in the stator coil 1A in the related art illustrated in FIG. 2, it is possible to contribute to size reduction in the rotary electric machine. Further, by reliably inserting the stator coils 1*a* and 1*b*, it is possible to eliminate a variation in a twisted portion of the coil (end portion of the coil).

According to the embodiment of the present invention described above, the following operational effects are obtained.

(1) The rotary electric machine in the present invention includes the stator core 2 provided with the plurality of slots, and the plurality of stator coils 1 arranged side by side in the radial direction of the stator core 2 and arranged in the plurality of slots. The stator coil 1 includes the two linear portions 5 that penetrate through the slots different from each other in layers different from each other in the axial direction of the stator core 2, and the turn portion 4 that connects the two linear portions 5. The turn portion 4 has the top portion 6 that is at a position farthest from the stator core 2 in the axial direction, the two inclined portions 7 that connect the top portion 6 and the linear portion 5, and the bent portion 8 that is bent outward in the radial direction. The stator coil 1 includes a first stator coil 1*a* and a second stator coil 1*b* that overlap each other in the axial direction. The bent portions 8 of the first stator coil 1*a* and the second stator coil 1*b* are at different positions in the circumferential direction, the bent portion 8 of the first stator coil 1*a* is formed at the inclined portion 7 of the first stator coil 1*a*, and the bent portion 8 of the second stator coil 1*b* is formed at the top portion 6 of the second stator coil 1*b*. The turn portion 4 of the second stator coil 1*b* is at a position closer to the stator core 2 than the turn portion 4 of the first stator coil 1*a* in the axial direction. With such a configuration, it is possible to provide the coil 1 of the rotary electric machine in which the height of the coil end is suppressed and a defect rate during assembly is improved.

(2) The inclined portion of the first stator coil 1*a* is longer than the inclined portion of the second stator coil 1*b*. With such a configuration, it is possible to realize a configuration of the bent portion 8 in the present invention while overlapping the coils in the axial direction.

(3) The bent portion 8 of the first stator coil 1*a* is disposed at the inclined portion 7 on the outer side of the first stator coil 1*a* in the radial direction. With such a configuration, it is possible to form a large exposed area with which the insertion jig 3 can reliably press the small-crotch stator coil 1*b*.

Note that the present invention is not limited to the above embodiment, and various modifications and other configurations can be combined without departing from the gist of the present invention. In addition, the present invention is not limited to one including all the configurations described in the above embodiment, and includes one in which a portion of the configuration is deleted.

REFERENCE SIGNS LIST

- 1 stator coil
- 1*a* large-crotch stator coil
- 1*b* small-crotch stator coil
- 1*c* large-crotch stator coil in related art
- 1*d* small-crotch stator coil in related art
- 2 stator core
- 3 insertion jig
- 3*a* large-crotch U-shaped coil pressing reference
- 3*b* small-crotch U-shaped coil pressing reference
- 3*c* direction in which insertion jig is pressed
- 4 turn portion
- 5 linear portion
- 6 top portion
- 7 inclined portion
- 8 bent portion
- 8*a* bent portion axis
- 100 stator

The invention claimed is:

1. A rotary electric machine comprising:
- a stator core provided with a plurality of slots; and
- a plurality of stator coils arranged side by side in a radial direction of the stator core and arranged in the plurality of slots,
- wherein the stator coil includes two linear portions that penetrate through the slots different from each other in layers different from each other in the axial direction of the stator core, and a turn portion that connects the two linear portions,
- the turn portion includes a top portion which is at a position farthest from the stator core in the axial direction, two inclined portions that connect the top portion and the linear portion, and a bent portion that is bent outward in the radial direction,
- the stator coil includes a first stator coil and a second stator coil that overlap each other in the axial direction,
- the first stator coil and the second stator coil have different circumferential intervals between respective two linear portions thereof,
- bent portions of the first stator coil and the second stator coil are at different positions in a circumferential direction,
- the bent portion of the first stator coil is formed at the inclined portion of the first stator coil,
- the bent portion of the second stator coil is formed at the top portion of the second stator coil, and
- a turn portion of the second stator coil is located closer to the stator core than a turn portion of the first stator coil in the axial direction.

2. The rotary electric machine according to claim 1, wherein the inclined portion of the first stator coil is longer than the inclined portion of the second stator coil.

3. The rotary electric machine according to claim 1, wherein the bent portion of the first stator coil is disposed at the inclined portion on an outer side of the first stator coil in a radial direction.

* * * * *